United States Patent
Harvey

[11] 3,745,325
[45] July 10, 1973

[54] PHOTOGRAPHIC LIGHT

[75] Inventor: Donald M. Harvey, Rochester, N.Y.

[73] Assignee: Eastman Kodak Company, Rochester, N.Y.

[22] Filed: Aug. 17, 1971

[21] Appl. No.: 172,457

[52] U.S. Cl.. 240/1.3, 240/41.35 R;41.35 C, 350/1, 350/299
[51] Int. Cl........................... G03b 15/02, F21v 7/00
[58] Field of Search..................... 240/1.3, 41, 41 D, 240/41 M, 41.35 R, 41.35 A, 41.35 B, 41.35 C, 41.15, 103; 350/1, 163, 164, 166, 290, 299; 313/112–116; 117/33.3

[56] References Cited
UNITED STATES PATENTS

| | | | |
|---|---|---|---|
| 3,645,601 | 2/1972 | Doctoroff et al. | 350/1 |
| 2,552,185 | 5/1951 | Koch | 240/41.35 R X |
| 3,322,946 | 5/1967 | Cooper | 240/41.35 R |
| 3,174,067 | 3/1965 | Bahrs | 350/1 X |
| 2,914,989 | 12/1959 | Gretener | 350/1 |

*Primary Examiner*—Samuel S. Matthews
*Assistant Examiner*—Richard M. Sheer
*Attorney*—William H. J. Kline et al.

[57] ABSTRACT

A photographic light has a light source and a reflector. The reflector has a pair of surfaces, the innermost of which is elliptical in cross-section and is coated with a material which is transparent to infrared radiation but reflective of visible radiation. The outermost surface is roughened and coated with a material which is reflective of both visible and infrared radiation.

In another embodiment, the outermost surface of the reflector is elliptical in cross-section but has a different focal point than the innermost surface and is coated with a reflective material.

2 Claims, 3 Drawing Figures

Patented July 10, 1973

DONALD M. HARVEY
INVENTOR.

BY G. Herman Childress

W. H. J. Kline

ATTORNEYS

PHOTOGRAPHIC LIGHT

BACKGROUND OF THE INVENTION

1. Field of the Invention

The present invention relates to photographic lights and in particular to a photographic light with an improved reflector.

2. Description of the Prior Art

Photographic lights incorporating reflectors which are elliptical in cross-section are well known. In this type of photographic light, the light source is located at one of the focal points of the elliptical reflector, with a reflective coating on the surface of the reflector directing incident rays to the second focal point. This insures maximum efficiency in the utilization of the light emanating from the light source. However, it is virtually impossible to restrict the light source to radiation which is in the visible spectrum and therefore the light source generates infrared radiation as well as visible radiation. The standard elliptical reflector focuses the infrared as well as the visible radiation at the focal point of the elliptical reflector. Sometimes this results in an infrared flux density which is sufficient to ignite material or burn an individual located at the focal point of the elliptical reflector. The problems created by such lights are especially pronounced when they are used with motion picture cameras due to the relatively long time the light source is on during the filming of a scene.

Attempts to prevent the ignition of the material at the focal point have incorporated infrared absorbing materials in the construction of the elliptical reflector. However, this causes a heat build-up in the photographic light which may destroy either the light source or the reflective surface, or may cause burns to an operator who handles the photographic light immediately after its use. There is thus a need for a photographic light which prevents the focusing of infrared or heat-type radiation at the focal point of the elliptical reflector while simultaneously preventing heat build-up in the photographic light and maintaining the efficiency of the photographic light in the visible portion of the spectrum used for photographing a scene.

SUMMARY OF THE INVENTION

An object of the present invention is to provide a photographic light which avoids damaging concentrations of infrared radiation between the light and the scene without corresponding undesirable heat build-up in the light.

A photographic light of the present invention provides a reflector for rays from a light source which includes a first elliptical surface which is reflective of visible radiation but is transparent to infrared radiation. A second (rear) surface of the reflector reflects the infrared radiation in a manner which avoids focusing of such rays at the focal point of the first elliptical surface. In one embodiment this is done by roughening the rear surface of the reflector to produce relatively diffuse reflected infrared radiation. In a second embodiment, the second reflective surface is formed into a shape that has different geometric parameters than the first elliptical surface, so as to avoid focusing of the infrared rays at the same point as the visible rays reflected from the first surface.

The invention and its objects and advantages will become more apparent in the detailed description of the preferred embodiments presented below.

BRIEF DESCRIPTION OF THE DRAWINGS

In detailed description of the preferred embodiments of the invention presented below, reference is made to the accompanying drawings in which.

DETAILED DESCRIPTION OF THE INVENTION

Because photographic lights are well known, the present description will be directed in particular to those portions of the photographic light forming part of or cooperating more directly with a reflector in accordance with the present invention. It is to be understood that elements of a photographic light not specifically shown or described may take various forms well known to those skilled in the art.

Figure 1:
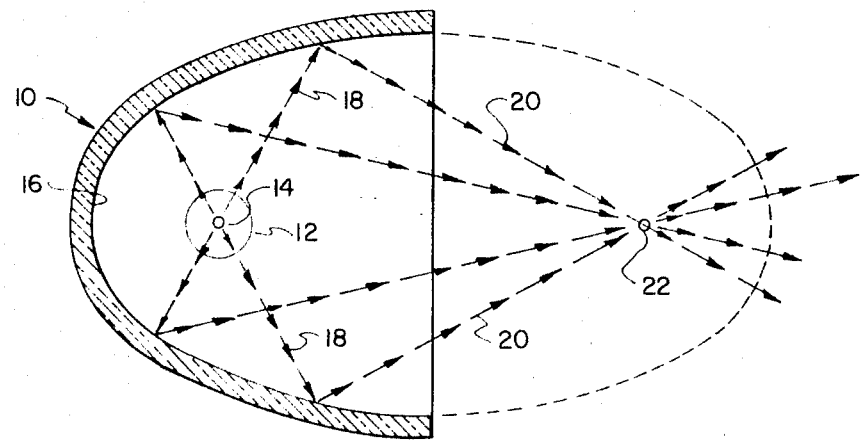
FIG. 1 is a cross-section of an elliptical reflector of a type well known in the prior art.

Referring now to FIG. 1, an elliptical reflector 10 of a type well known in the prior art comprises a light source 12 positioned at a point 14 defining one of the foci of an inner elliptical reflective surface 16 of reflector 10. Surface 16 typically is made of a suitable highly-polished metal and/or is coated with a material having the desired reflective characteristics. Surface 16 is intended to reflect substantially all of the rays that each the surface from the light source. In operation, light source 12 is actuated thereby directing incident light rays 18 against reflective inner-surface 16 of reflector 10. Because the reflector is elliptical, reflected light rays 20 are focused at a point 22 defining the second focal point of surface 16, thereby insuring maximum efficiency in the use of all of the available radiation from light source 12. As has been described earlier, infrared radiation emanating from light source 12 also will be reflected by surface 16 and directed to focal point 22, thereby producing danger of fire or burning.

Figure 2:
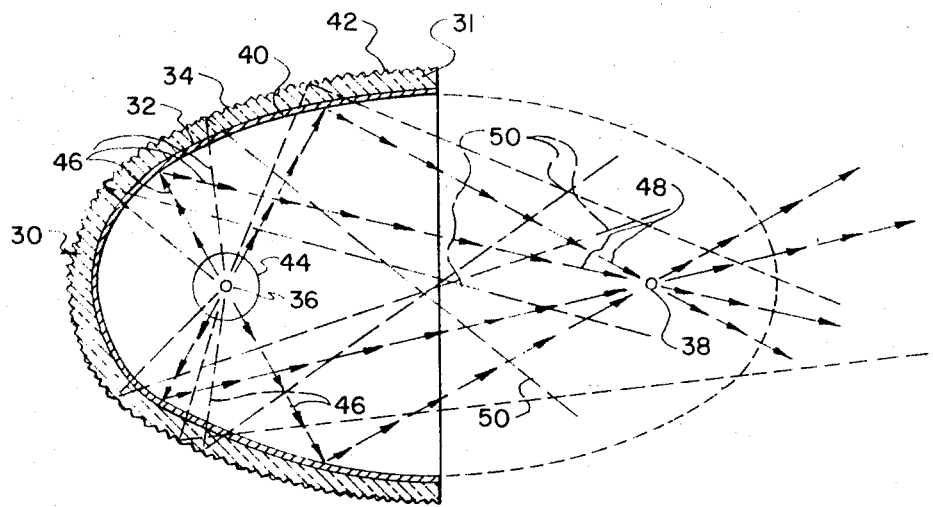
FIG. 2 is a cross-section similar to FIG. 1 but showing a photographic light according to one embodiment of the present invention wherein a second or rear surface of a reflector is roughened.

Referring now to FIG. 2, a reflector, generally designated 30, constructed according to this invention comprises a body 31 that may be made from glass or other suitable materials and includes an inner-surface 32, and an outer-surface 34. The reflector is generally elliptical in cross section so that it has a first focal point 36 and a second focal point 38. A partial reflective coating 40 of substantially uniform thickness is applied to the entire inner-surface 32 of reflector 30 so as to preserve the elliptical cross-section of that surface and to focus radiation reflected from that surface at point 38. Coating 40 is of a material which is transparent to radiation in the infrared band of the spectrum but which is reflective of radiation in the visible portion of the spectrum. A fully reflective coating 42 is applied to outer-surface 34 of reflector 30. In accordance with the embodiment shown in FIG. 2, outer-surface 34 is a non-uniform, relatively rough surface so that reflective coating 42 does not possess the focusing characteristics of coating 40 on inner-surface 32. Surface 34 can be roughened by mechanical or chemical processes, or by other suitable means. A light source 44 is positioned at focal point 36 of reflector 30. While not illustrated in the drawings, it will be understood that the reflector is mounted in a suitable housing, and that the light source can be supported by the reflector or the housing, for example. 34 affect the The flux In operation, light source 44 is energized and furnishes radiation in the visible and infrared spectrum to reflector 30, as illustrated by incident rays 46. Light in the visible spectrum is reflected by coating 40 and, because of the elliptical shape of reflector 30, is directed to focal point 38 of reflector 30, as illustrated by reflected rays 48. Substantially all of the radiation in the infrared spectrum passes through coating 40 and impinges upon coating 42 on outer surface 34 of reflector 30. Substantially all of this infrared radiation is reflected by coating 42 thereby preventing passage of the infrared radiation to the rear of reflector 30 where it might adversely affect the reflector housing and/or be uncomfortable or dangerous to the photographer. However, because of the roughened nature of outer-surface 34, reflection by coating 42 does not focus the infrared radiation at focal point 38, but instead scatters the infrared rays as illustrated by reflected rays 50. The flux density of infrared radiation incident at point 38 is thus reduced from that in the elliptical reflector of the prior art, and the concentration of the infrared rays at any point is insufficient to be harmful to the subject being photographed.

Figure 3:
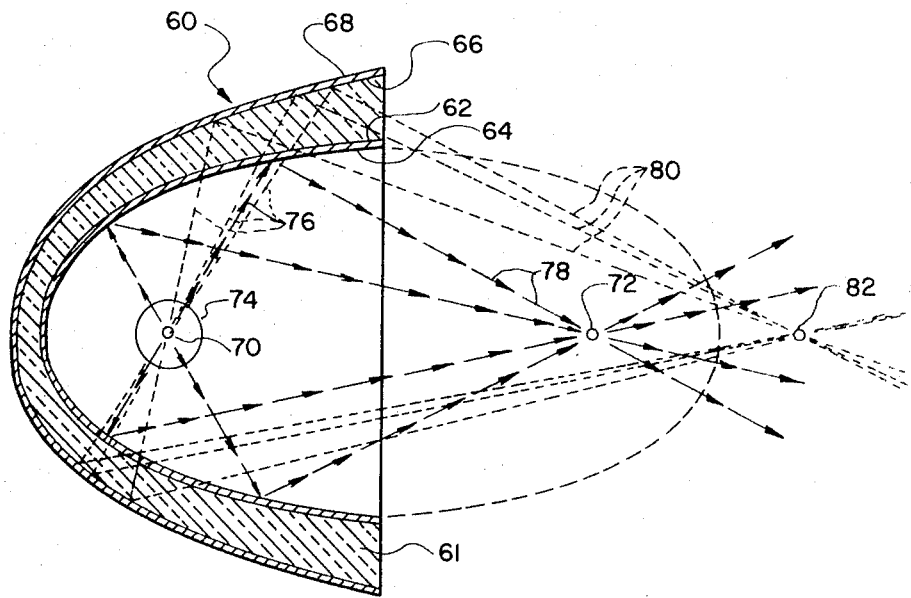
FIG. 3 is a cross-section of a second embodiment of this invention wherein a reflector has an elliptical rear surface.

In the FIG. 3 embodiment of this invention the shape of the outer-surface of the reflector is relied on to prevent focusing of infrared radiation at the second focal point. Reflector 60 comprises a body 61 that includes an inner-surface 62 with a partially reflective coating 64 of uniform thickness applied thereto (similar to coating 40) and an outer-surface 66 with a fully reflective coating 68 applied thereto. The surface 62 and coating 64 are elliptical in cross section, having first and second focal points 70 and 72, respectively, corresponding to the elliptical parameters of surface 62 and the coating thereon. Outer-surface 66 is also elliptical in cross-section but, as is greatly exaggerated in FIG. 3, has different elliptical parameters and, in particular, does not have a focal point at point 72. Other geometric cross-sections are also permissible for surface 66, such as parabolic or circular, provided they are not characterized by focusing at point 72. A light source 74 is positioned at focal point 70. Any shape for surface 66 which tends to concentrate the rays should have a focus point located from the light source by a distance which is greater than the distance that most of the rays could be expected to travel, or by a distance that insures that most of the energy of the rays has been expended before they reach the focus point.

In operation, light source 74 is actuated thereby directing radiation against reflector 60, as illustrated by incident rays 76. Radiation in the visible spectrum is reflected by coating 64 on surface 62 and, because of the elliptical characteristics of surface 62, is focused at focal point 72 of reflector 60, as illustrated by reflected rays 78. Radiation in the infrared spectrum passes through coating 64 and impinges upon coating 68 on outer-surface 66 of reflector 60. The infrared radiation is reflected by coating 68 thereby preventing passage of the radiation to the rear of reflector 60. However, because surface 66 does not have a focal point at point 72, reflection by coating 68 does not cause focusing of the infrared radiation at point 72, as illustrated by reflected rays 80 which are focused at a point 82. Thus, the infrared flux density at point 72 is reduced from that present with the elliptical reflector of the prior art.

Coatings (such as shown at 40 and 64) capable of reflecting light rays in the visible portion of the light spectrum and passing those rays in the infrared portion of the spectrum are well known. These coatings may be dichroic coatings, for example.

The invention has been described in detail with particular reference to the preferred embodiments thereof, but it will be understood that variations and modifications can be effected within the spirit and scope of the invention.

I claim:

1. A reflector for use with a light source adapted to produce visible radiation and infrared radiation, the reflector comprising:

means defining a first surface and a second surface, said first surface being substantially elliptical in cross-section and having a first focal point and a second focal point, a coating on said first surface, the coating being of substantially uniform thickness so that the coating is substantially elliptical in cross-section, said coating comprising a material which is reflective of visible radiation and substantially transparent to infrared radiation so that visible radiation directed against said coating on said first surface from a light source positioned substantially at said first focal point of said first surface is reflected by the coating in a focused manner to said second focal point of said first surface; and said second surface being substantially elliptical in cross-section and having a first focal point and a second focal point, said second surface being shaped so that its first focal point is substantially coincident with the first focal point of said first surface while its second focal point is not coincident with the second focal point of said first surface, said second surface further being coated with a material which is reflective of infrared radiation so that infrared radiation directed against said coating on said second surface from a light source positioned at the first focal point of said second surface is reflected to said second focal point of said second elliptical surface.

2. A photographic light comprising:

a light source capable of producing both visible and infrared radiation;

a reflector body having an inner surface comprising first reflector surface, said first surface being substantially elliptical in cross-section with a first and second focal point and being positioned relative to said light source so that said light source is coincident with said first focal point, a coating on said first surface, said coating comprising a material which is reflective of visible radiation and substantially transparent to infrared radiation so that visible radiation from said light source which is directed against said coating on said first surface is reflected to said second focal point of said first surface; and the reflector body having an outer surface comprising a second reflector surface, said second surface being substantially elliptical in cross-section with a first and second focal point and being positioned relative to the light source so that said light source is coincident with said first focal point, a coating on said second surface comprising a material which is reflective of both visible and infrared radiation so that the infrared radiation from said light source which is directed against said coating on said second surface is reflected to said second focal point of said second surface, said second focal points of said first and second surfaces being spaced from each other so that visible and infrared radiation from the first and second surfaces are not focused at the same point.

* * * * *